United States Patent
Yeh (10) Patent No.: US 12,333,168 B2
(45) Date of Patent: Jun. 17, 2025

(54) ACCESSING METHOD OF MEMORY MODULE BASED ON DIFFERENT CONFIGURATIONS OF PHYSICAL MANAGEMENT UNIT, MEMORY STORAGE DEVICE, AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 81 days.

(21) Appl. No.: 18/162,724

(22) Filed: Feb. 1, 2023

(65) Prior Publication Data
US 2024/0192868 A1    Jun. 13, 2024

(30) Foreign Application Priority Data
Dec. 7, 2022 (TW) .................................. 111146882

(51) Int. Cl.
*G06F 3/06* (2006.01)
*G06F 12/02* (2006.01)

(52) U.S. Cl.
CPC .......... *G06F 3/0634* (2013.01); *G06F 3/0604* (2013.01); *G06F 3/0679* (2013.01); *G06F 12/0246* (2013.01); *G06F 2212/7202* (2013.01)

(58) Field of Classification Search
CPC .... G06F 3/0604; G06F 3/0634; G06F 3/0679; G06F 12/0246; G06F 2212/7202
See application file for complete search history.

(56) References Cited

U.S. PATENT DOCUMENTS

| 10,310,739 B2 * | 6/2019 | Chen | G06F 3/0679 |
| 2013/0232296 A1 * | 9/2013 | Yonezawa | G06F 12/0246 711/103 |
| 2017/0052704 A1 * | 2/2017 | Yeh | G06F 12/02 |
| 2019/0019598 A1 * | 1/2019 | Martin | H01B 3/421 |
| 2019/0332320 A1 * | 10/2019 | Wu | G06F 3/0616 |

FOREIGN PATENT DOCUMENTS

TW          201709063          3/2017

* cited by examiner

*Primary Examiner* — Aracelis Ruiz
(74) *Attorney, Agent, or Firm* — JCIPRNET (57) ABSTRACT

A memory management method, a memory storage device, and a memory control circuit unit are provided. The method includes: in a first operation mode, setting a physical management unit to cross N physical regions in a rewritable non-volatile memory module; in a second operation mode, setting the physical management unit to cross M physical regions in the rewritable non-volatile memory module, wherein N is greater than M; and accessing the rewritable non-volatile memory module based on the physical management unit.

21 Claims, 10 Drawing Sheets

ACCESSING METHOD OF MEMORY MODULE BASED ON DIFFERENT CONFIGURATIONS OF PHYSICAL MANAGEMENT UNIT, MEMORY STORAGE DEVICE, AND MEMORY CONTROL CIRCUIT UNIT

CROSS-REFERENCE TO RELATED APPLICATION

This application claims the priority benefit of Taiwan application serial no. 111146882, filed on Dec. 7, 2022. The entirety of the above-mentioned patent application is hereby incorporated by reference herein and made a part of this specification.

BACKGROUND

Technical Field

The disclosure relates to a memory management technology, and in particular to a memory management method, a memory storage device, and a memory control circuit unit.

Description of Related Art

The rapid growth of mobile phones, tablet computers, and notebook computers in recent years has led to a rapid increase in consumer demand for storage media. Since the rewritable non-volatile memory module (for example, a flash memory) has characteristics such as non-volatile data, power saving, small volume, and no mechanical structure, the rewritable non-volatile memory module is very suitable for being built into various portable electronic devices exemplified above.

As the capacity of the rewritable non-volatile memory module gradually increases, the physical management unit inside the rewritable non-volatile memory module also expands from a single physical block to a virtual block including multiple physical blocks. However, in addition to lack of management flexibility, the virtual block with a fixed size cannot enable the rewritable non-volatile memory module to provide the optimal performance under different operation situations.

SUMMARY

The disclosure provides a memory management method, a memory storage device, and a memory control circuit unit, which may improve management flexibility and performance of a rewritable non-volatile memory module.

An exemplary embodiment of the disclosure provides a memory management method for a rewritable non-volatile memory module. The rewritable non-volatile memory module includes multiple physical regions. The memory management method includes the following steps. In a first operation mode, a physical management unit is set to cross N physical regions among the physical regions. In a second operation mode, the physical management unit is set to cross M physical regions among the physical regions, and N is greater than M. The rewritable non-volatile memory module is accessed based on the physical management unit.

An exemplary embodiment of the disclosure further provides a memory storage device, which includes a connection interface unit, a rewritable non-volatile memory module, and a memory control circuit unit. The connection interface unit is used to couple to a host system. The rewritable non-volatile memory module includes multiple physical regions. The memory control circuit unit is coupled to the connection interface unit and the rewritable non-volatile memory module. The memory control circuit unit is used to execute the following. In a first operation mode, a physical management unit is set to cross N physical regions among the physical regions. In a second operation mode, the physical management unit is set to cross M physical regions among the physical regions, and N is greater than M. The rewritable non-volatile memory module is accessed based on the physical management unit.

An exemplary embodiment of the disclosure further provides a memory control circuit unit for controlling a rewritable non-volatile memory module. The rewritable non-volatile memory module includes multiple physical regions. The memory control circuit unit includes a host interface, a memory interface, and a memory management circuit. The host interface is used to couple to a host system. The memory interface is used to couple to the rewritable non-volatile memory module. The memory management circuit is coupled to the host interface and the memory interface. The memory management circuit is used to execute the following. In a first operation mode, a physical management unit is set to cross N physical regions among the physical regions. In a second operation mode, the physical management unit is set to cross M physical regions among the physical regions, and N is greater than M. The rewritable non-volatile memory module is accessed based on the physical management unit.

Based on the above, in different operation modes, the physical management unit may be set to cross different numbers of physical regions in the rewritable non-volatile memory module. The management flexibility and the performance of the rewritable non-volatile memory module can be improved through flexibly configuring the physical management unit to access the rewritable non-volatile memory module.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
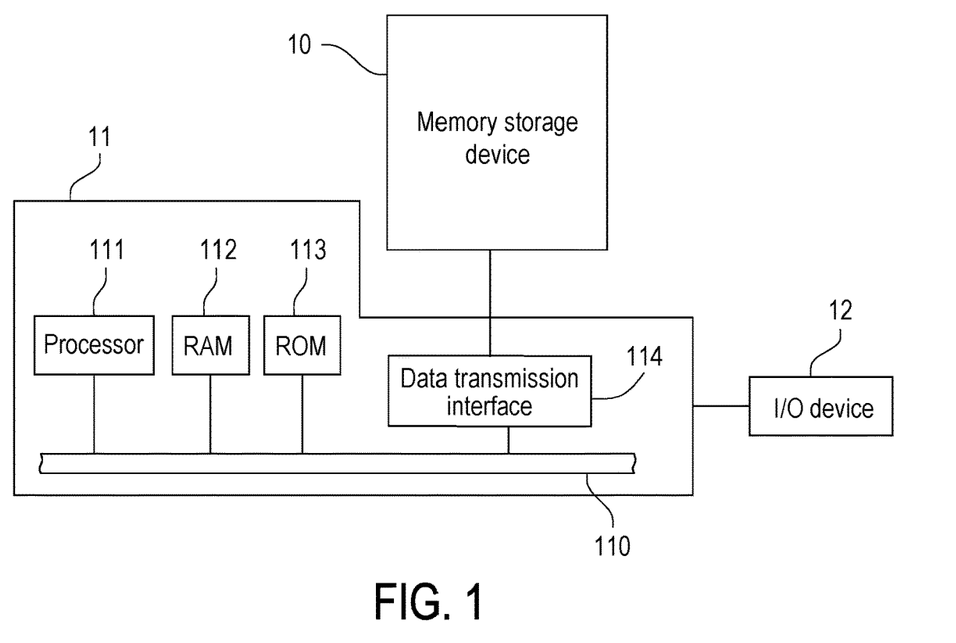
FIG. 1 is a schematic diagram of a host system, a memory storage device, and an input/output (I/O) device according to an exemplary embodiment of the disclosure.
Figure 2:
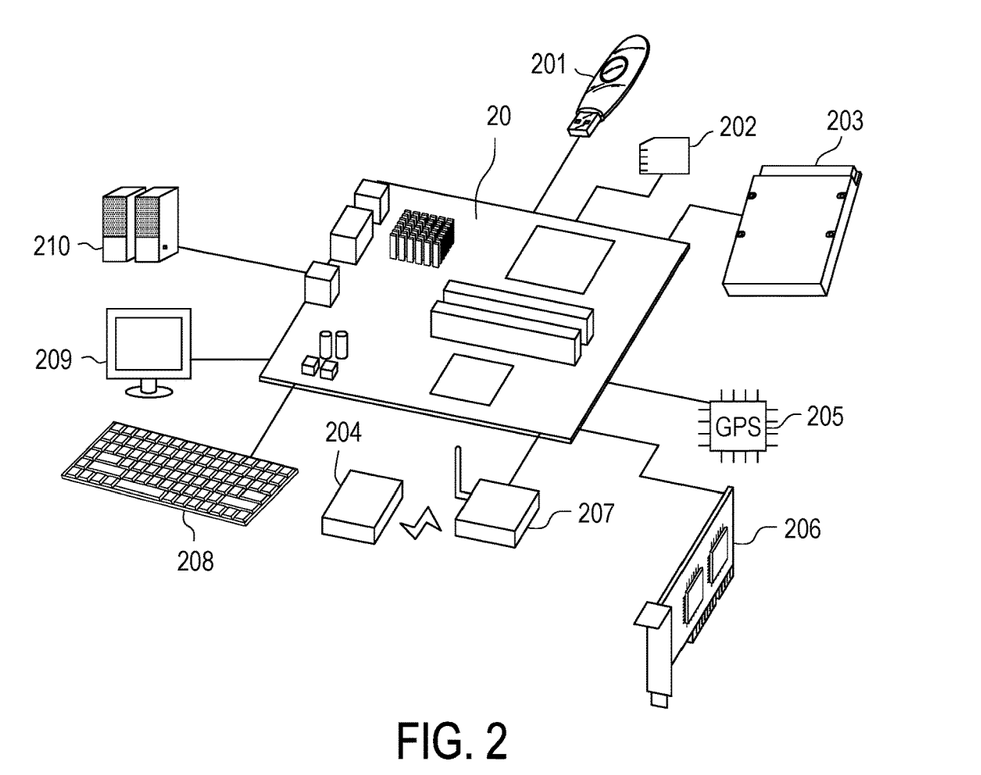
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data in the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a WiFi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
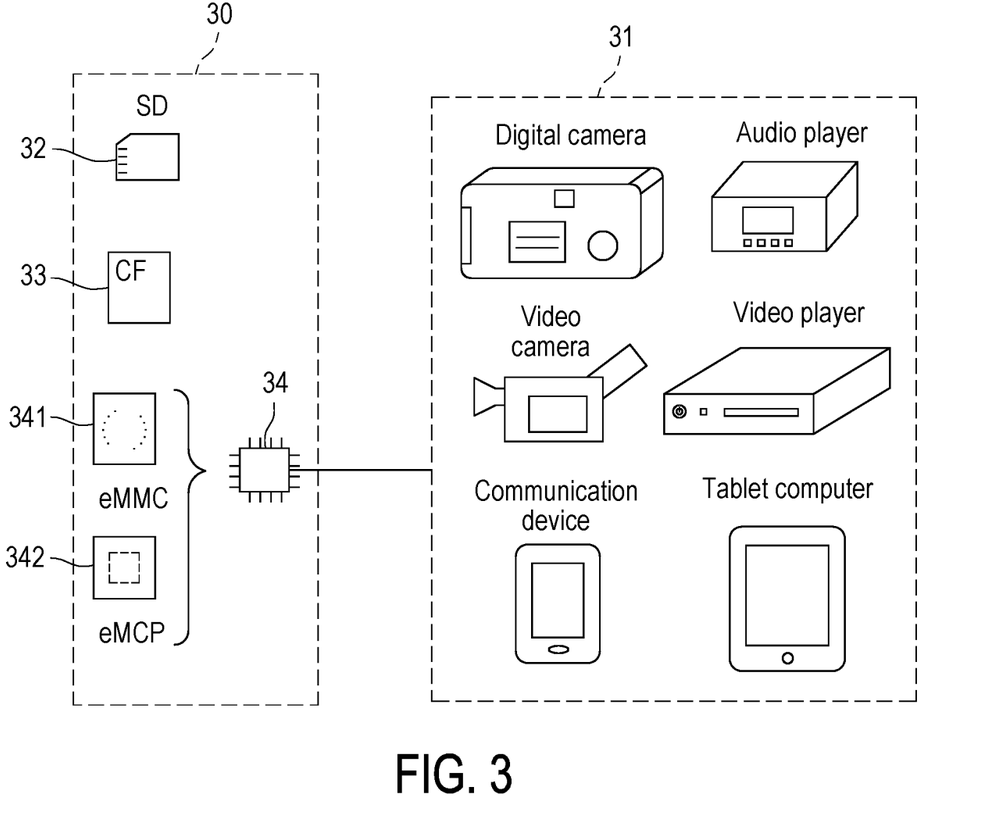
FIG. 3 is a schematic diagram of a host system and a memory storage device according to an exemplary embodiment of the disclosure.

FIG. 3 is a schematic diagram of a host system and a memory storage device according to an exemplary embodiment of the disclosure.

Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
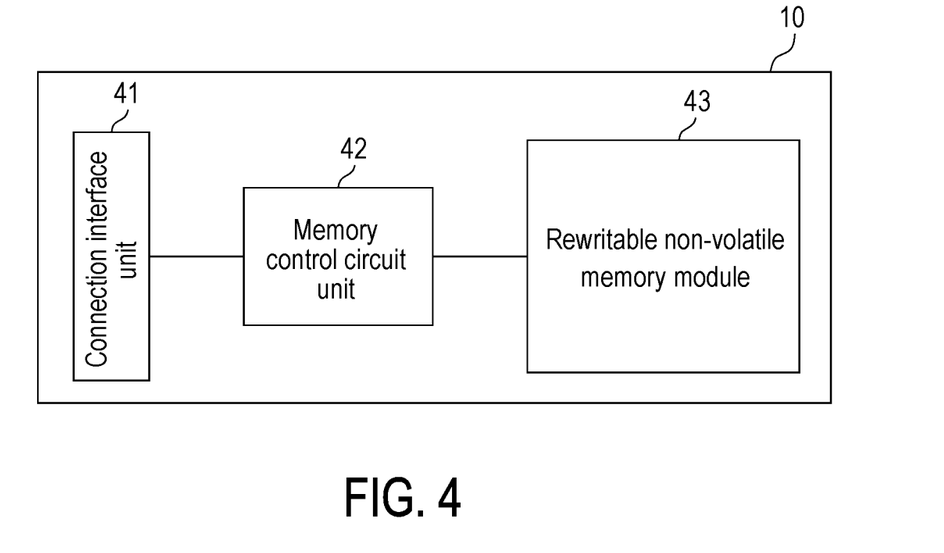
FIG. 4 is a schematic diagram of a memory storage device according to an exemplary embodiment of the disclosure.

FIG. 4 is a schematic diagram of a memory storage device according to an exemplary embodiment of the disclosure.

Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage states. Through applying a read voltage, it is possible to judge which storage state a memory cell belongs to, so as to obtain one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If one memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area includes multiple physical sectors for storing user data, and the redundancy bit area is used to store system data (for example, management data such as an error correcting code). In an exemplary embodiment, the data bit area includes 32 physical sectors, and the size of one physical sector is 512 bytes (B). However, in other exemplary embodiments, the data bit area may also include 8, 16, more, or less physical sectors, and the size of each physical sector may also be greater or smaller. On the other hand, the physical erasing unit is the smallest unit of erasure. That is, each physical erasing unit includes the smallest number of memory cells to be erased together. For example, the physical erasing unit is a physical block.

Figure 5:
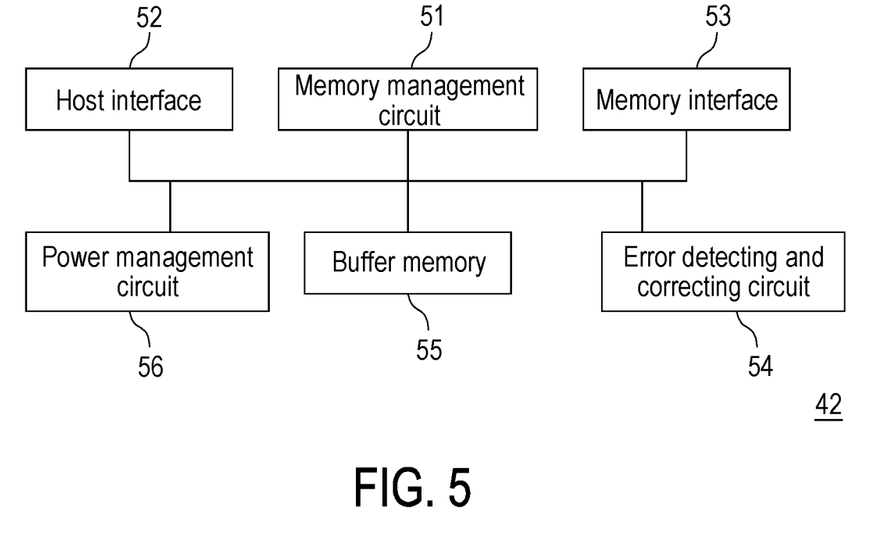
FIG. 5 is a schematic diagram of a memory control circuit unit according to an exemplary embodiment of the disclosure.

FIG. 5 is a schematic diagram of a memory control circuit unit according to an exemplary embodiment of the disclosure.

Please refer to FIG. 5. The memory control circuit unit 42 includes a memory management circuit 51, a host interface 52, and a memory interface 53. The memory management circuit 51 is used to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored in a specific region (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43.

The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, executing a garbage collection operation, etc.). The command sequences are, for example, generated by the memory management circuit 51 and sent to the rewritable non-volatile memory module 43 through the memory interface 53. The command sequences may include one or more signals or data on a bus. The signals or the data may include command codes or program codes. For example, the read command sequence includes information such as a read identification code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to execute error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 executes the error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
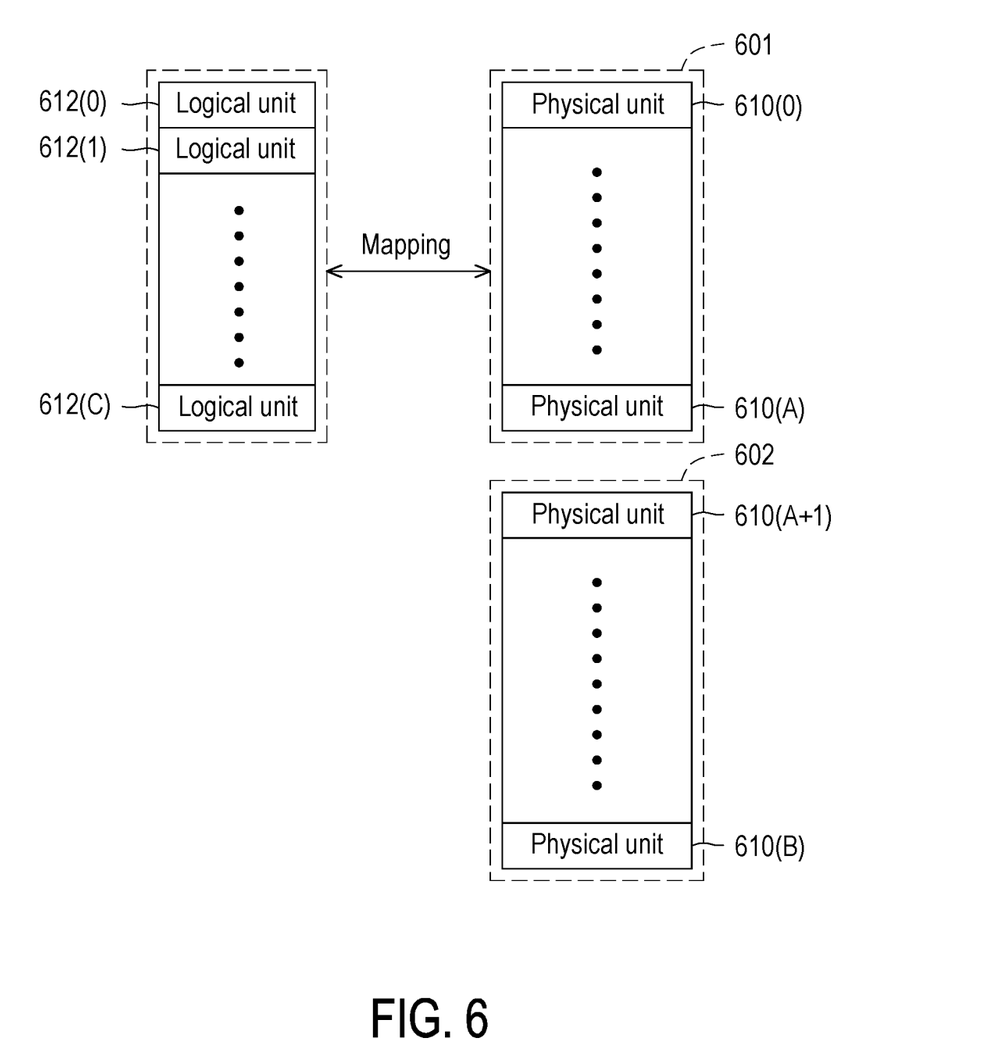
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6. The memory management circuit 51 may logically group physical units 610(0) to 610(B) in the rewritable non-volatile memory module 43 into a storage area 601 and a spare area 602. In an exemplary embodiment, a physical unit refers to a physical programing unit. However, in another exemplary embodiment, a physical unit may also include multiple physical programing units.

The physical units 610(0) to 610(A) in the storage area 601 are used to store user data (for example, the user data of the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated (or added) to the spare area 602. In addition, the physical units (or physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or consist of multiple continuous or discontinuous logical addresses. A, B, and C are all positive integers and may be adjusted according to practical requirements, which is not limited in the disclosure.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit is invalid data.

The memory management circuit 51 may record management data (also referred to as logical-to-physical mapping information) describing a mapping relationship between the logical unit and the physical unit in at least one logical-tophysical mapping table. When the host system 11 intends to read data from the memory storage device 10 or write data to the memory storage device 10, the memory management circuit 51 may access the rewritable non-volatile memory module 43 according to information in the logical-to-physical mapping table.

Figure 7:
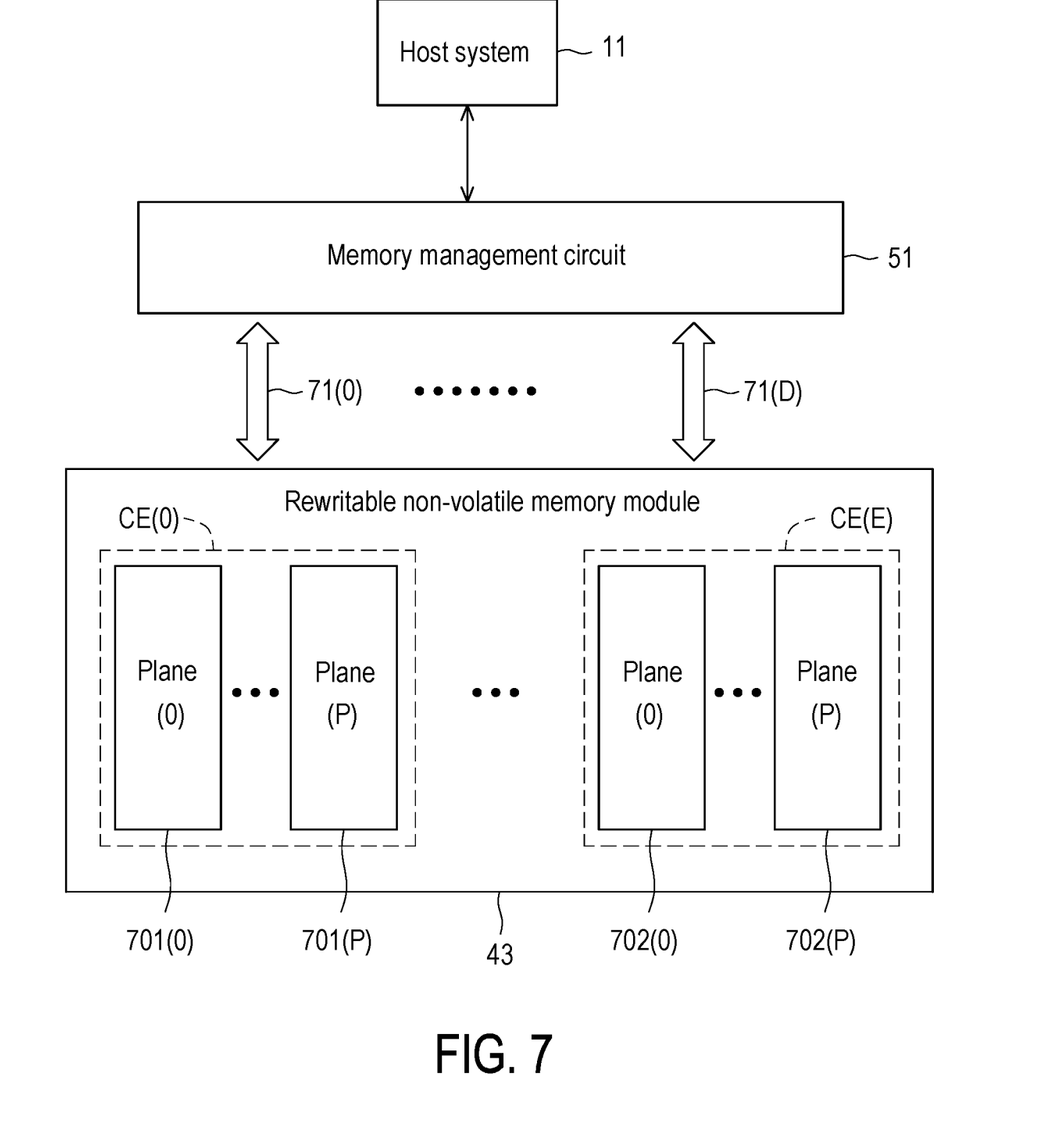
FIG. 7 is a schematic diagram of a system architecture of a memory storage device according to an exemplary embodiment of the disclosure.

FIG. 7 is a schematic diagram of a system architecture of a memory storage device according to an exemplary embodiment of the disclosure.

Please refer to FIG. 7. The rewritable non-volatile memory module 43 may include multiple chip enabled (CE) regions CE(0) to CE(E). For example, the rewritable non-volatile memory module 43 may include one or more dies. The die is obtained from a wafer through laser cutting. Each die may be divided into one or more chip enabled regions. Each of the chip enabled regions CE(0) to CE(E) may include one or more planes (also referred to as memory planes, labelled as a plane (0) to a plane (P) in FIG. 7). Each plane may include multiple physical units.

It should be noted that whether a certain chip enabled region may be accessed may be controlled through a chip enabled signal corresponding to the chip enabled region. For example, when the chip enabled signal corresponding to the chip enabled region CE(i) is pulled up, the rewritable non-volatile memory module 43 may read data from the chip enabled region CE(i) or store data in the chip enabled region CE(i). However, if the chip enabled signal corresponding to the chip enabled region CE(i) is not pulled up, the rewritable non-volatile memory module 43 cannot read the data from the chip enabled region CE(i) or store the data in the chip enabled region CE(i).

It should be noted that in the exemplary embodiment, each of the chip enabled regions CE(0) to CE(E) including the same number of planes is taken as an example. For example, the chip enabled region CE(0) includes the planes 701(0) to 701(P), the chip enabled region CE(E) includes the planes 702(0) to 702(P), and so on. However, the total number (that is, P) of planes in different chip enabled regions may also be different, which is not limited in the disclosure.

The memory management circuit 51 may access the rewritable non-volatile memory module 43 via channels (also referred to as memory channels) 71(0) to 71(D). In particular, each of the channels 71(0) to 71(D) may be used to access a specific chip enabled region. For example, the channel 71(*i*) may be used to access the chip enabled region CE(i). In addition, the values of D, E, and P may all be adjusted according to practical requirements and are not limited in the disclosure.

The memory management circuit 51 may use a physical management unit to manage physical units inside the rewritable non-volatile memory module 43. In particular, a physical management unit may include (also referred to as cross) multiple physical regions in the rewritable non-volatile memory module 43. Each physical region may correspond to one die, one chip enabled region, or one plane, and multiple physical regions may correspond to multiple dies, multiple chip enabled regions, or multiple planes. In other words, one physical management unit may cross multiple dies, multiple chip enabled regions, or multiple planes in the rewritable non-volatile memory module 43.

When data is to be written to a physical management unit, the memory management circuit 51 may issue write command sequences for at least part of the physical regions in the physical management unit. The write command sequences may be used to instruct the rewritable non-volatile memory module 43 to continuously write the data to at least part of the physical units in the physical regions. When data is to be read from a physical management unit, the memory management circuit 51 may issue read command sequences for at least part of the physical regions in the physical management unit. The read command sequences may be used to instruct the rewritable non-volatile memory module 43 to read the data from at least part of the physical units in the physical regions. In addition, when data is to be erased from a physical management unit, the memory management circuit 51 may issue erase command sequences for at least part of the physical regions in the physical management unit. The erase command sequences may be used to instruct the rewritable non-volatile memory module 43 to respectively perform an erasing operation on at least part of the physical units in the physical regions, so as to clear the data in the physical units.

The rewritable non-volatile memory module 43 may support different operation modes (also referred to as access modes). In different operation modes, the memory management circuit 51 may set the total number of physical regions included in (or crossed by) a physical management unit as different values. For example, in a certain operation mode (also referred to as a first operation mode), the memory management circuit 51 may set the physical management unit to cross N physical regions. In another operation mode (also referred to as a second operation mode), the memory management circuit 51 may set the physical management unit to cross M physical regions. The first operation mode is different from the second operation mode, and N is greater than M. Thereby, in different operation modes, the memory management circuit 51 may access the rewritable non-volatile memory module 43 based on physical management units with different sizes.

For example, in the first operation mode, the memory management circuit 51 may access multiple physical units in the N physical regions in the rewritable non-volatile memory module 43 through the physical management unit crossing the N physical regions. In the second operation mode, the memory management circuit 51 may access multiple physical units in the M physical regions in the rewritable non-volatile memory module 43 through the physical management unit crossing the M physical regions. Alternatively, from another point of view, in different operation modes (that is, the first operation mode and the second operation mode), the same physical region in the chip enabled regions CE(0) to CE(E) may be accessed through the physical management unit crossing the N physical regions or the physical management unit crossing the M physical regions.

Figure 8:
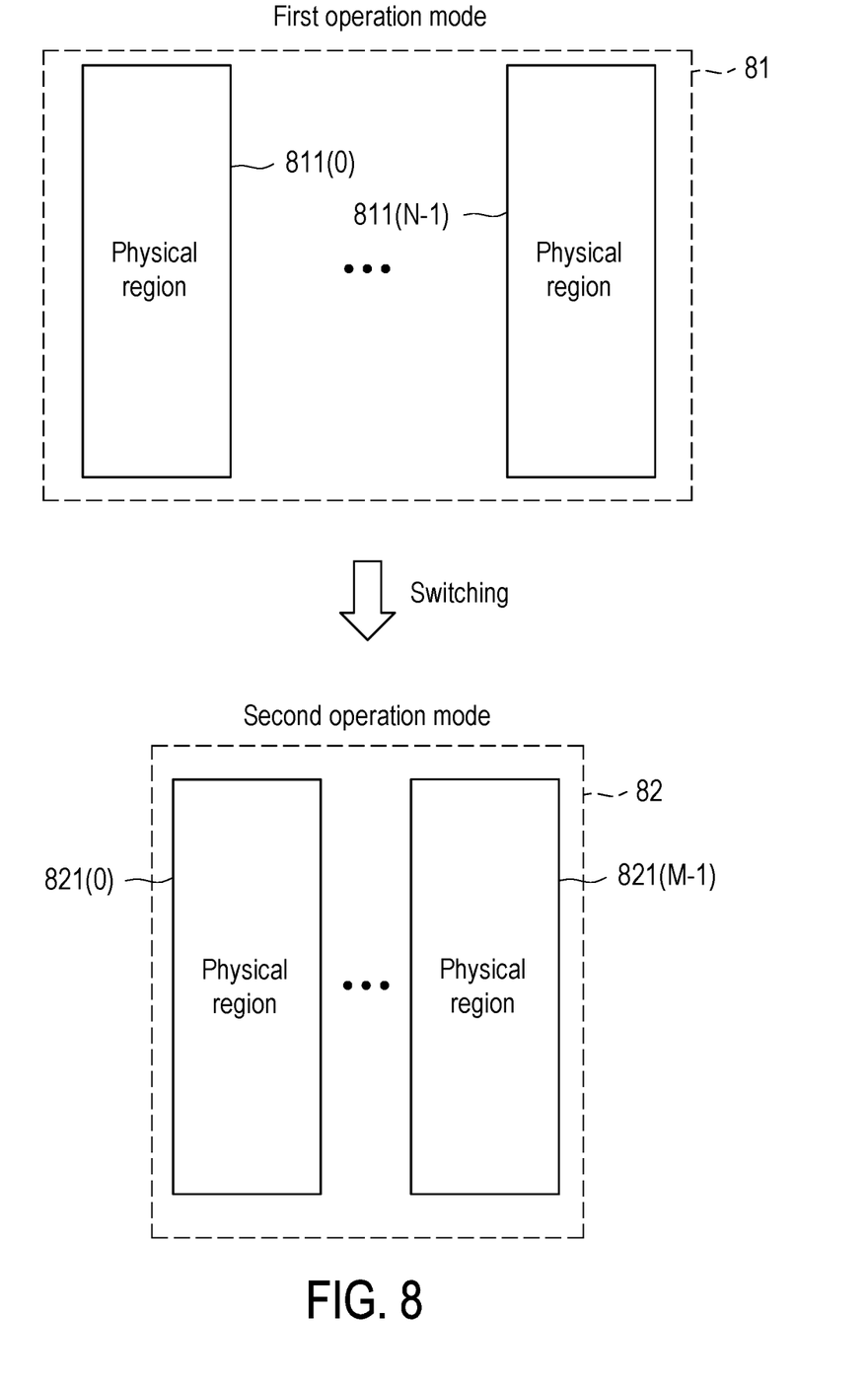
FIG. 8 is a schematic diagram of a physical management unit used in different operation modes according to an exemplary embodiment of the disclosure.

FIG. 8 is a schematic diagram of a physical management unit used in different operation modes according to an exemplary embodiment of the disclosure.

Please refer to FIG. 8. In the first operation mode, the memory management circuit 51 may use a physical management unit 81 to access the rewritable non-volatile memory module 43. The physical management unit 81 includes (or crosses) physical regions 811(0) to 811(N−1). The total number of the physical regions 811(0) to 811(N−1) is N. In other words, in the first operation mode, the physical management unit 81 may cross N dies, N chip enabled regions, or N planes inside the rewritable non-volatile memory module 43. Therefore, in the first operation mode, the memory management circuit 51 may continuously write data (also referred to as first data) to the N physical regions 811(0) to 811(N−1) included in the physical management unit 81.

On the other hand, in the second operation mode, the memory management circuit 51 may use a physical management unit 82 to access the rewritable non-volatile memory module 43. The physical management unit 82 includes (or crosses) physical regions 821(0) to 821(M−1). The total number of the physical regions 821(0) to 821(M−1) is M. In other words, in the second operation mode, the physical management unit 82 may cross M dies, M chip enabled regions, or M planes inside the rewritable non-volatile memory module 43, and N is greater than M. Therefore, in the second operation mode, the memory management circuit 51 may continuously write data (also referred to as second data) to the M physical regions 821(0) to 821(M−1) included in the physical management unit 82.

It should be noted that the physical regions 811(0) to 811(N−1) and the physical regions 821(0) to 821(M−1) in FIG. 8 may be completely different or at least partially identical physical regions in the rewritable non-volatile memory module 43. For example, it is assumed that the physical regions 811(0) and 821(0) are the same physical region in the rewritable non-volatile memory module 43. In the first operation mode, the physical region may be accessed through the physical management unit 81, and in the second operation mode, the physical region may be accessed through the physical management unit 82.

In an exemplary embodiment, in response to a change in the operation mode, the total number of physical regions included in (or crossed by) the physical management unit may correspondingly change. For example, if (in response to) the operation mode is (being) switched from the first operation mode to the second operation mode, the memory management circuit 51 may change the physical management unit used from the physical management unit 81 to the physical management unit 82. Alternatively, if (in response to) the operation mode is (being) switched back from the second operation mode to the first operation mode, the memory management circuitry 51 may change the physical management unit used from the physical management unit 82 back to the physical management unit 81.

In an exemplary embodiment, it is assumed that the operation mode of the rewritable non-volatile memory module 43 is preset as the first operation mode. In the first operation mode, the memory management circuit 51 may detect a specific event (also referred to as a target event). After detecting the target event, in response to the target event, the memory management circuit 51 may switch the operation mode of the rewritable non-volatile memory module 43 from the first operation mode to the second operation mode. Then, the memory management circuit 51 may access the rewritable non-volatile memory module 43 based on the physical management unit (for example, the physical management unit 82 of FIG. 8) corresponding to the second operation mode. In addition, after completing the target event, in response to completing the target event, the memory management circuit 51 may restore the operation mode from the second operation mode to the first operation mode. Then, the memory management circuit 51 may access the rewritable non-volatile memory module 43 based on the physical management unit (for example, the physical management unit 81 of FIG. 8) corresponding to the first operation mode. In an exemplary embodiment, through changing the operation mode of the rewritable non-volatile memory module 43 and/or the total number of physical regions crossed by the physical management unit, the event processing performance of the memory management circuit 51 for the target event can be improved.

In an exemplary embodiment, the target event includes one of a power-off event, a power-on event, and a table writing event. The power-off event includes the memory storage device 10 being normally or accidentally powered off. The power-on event includes the memory storage device 10 being powered on. The table writing event includes writing (that is, storing) table data to the rewritable non-volatile memory module 43. For example, the table data includes a logical-to-physical mapping table or other management tables. In addition, the type of the target event may also be increased or decreased according to practical requirements, which is not limited in the disclosure.

In particular, after detecting the target event, through reducing the total number of physical regions crossed by the physical management unit, the event processing performance of the memory management circuit 51 for the target event can be improved. For example, after the power-off event and/or the power-on event, the memory management circuit 51 often automatically executes data organization in the background. At this time, through reducing the total number of physical regions crossed by the physical management unit, the data in the rewritable non-volatile memory module 43 may be more quickly read, written, copied, and/or moved, thereby improving the event processing performance of the memory management circuit 51 for the power-off event and/or the power-on event. In addition, the amount of data of the table data that needs to be updated in the table writing event is often small. Therefore, through reducing the total number of physical regions crossed by the physical management unit, the data updating performance of the memory management circuit 51 for the table writing event can also be improved.

In an exemplary embodiment, the target event may also reflect that the total number of spare physical units in the rewritable non-volatile memory module 43 is less than a threshold. The spare physical unit does not store valid data. For example, the spare physical units refer to the physical units 610(A+1) to 610(B) in the spare area 602 of FIG. 6. In an exemplary embodiment, in response to the total number of spare physical units being less than the threshold, a data consolidation operation may be triggered (that is, activated). For example, the data consolidation operation may include a garbage collection operation. Therefore, after detecting the target event, the memory management circuit 51 may execute the data consolidation operation based on the second operation mode.

Figure 9:
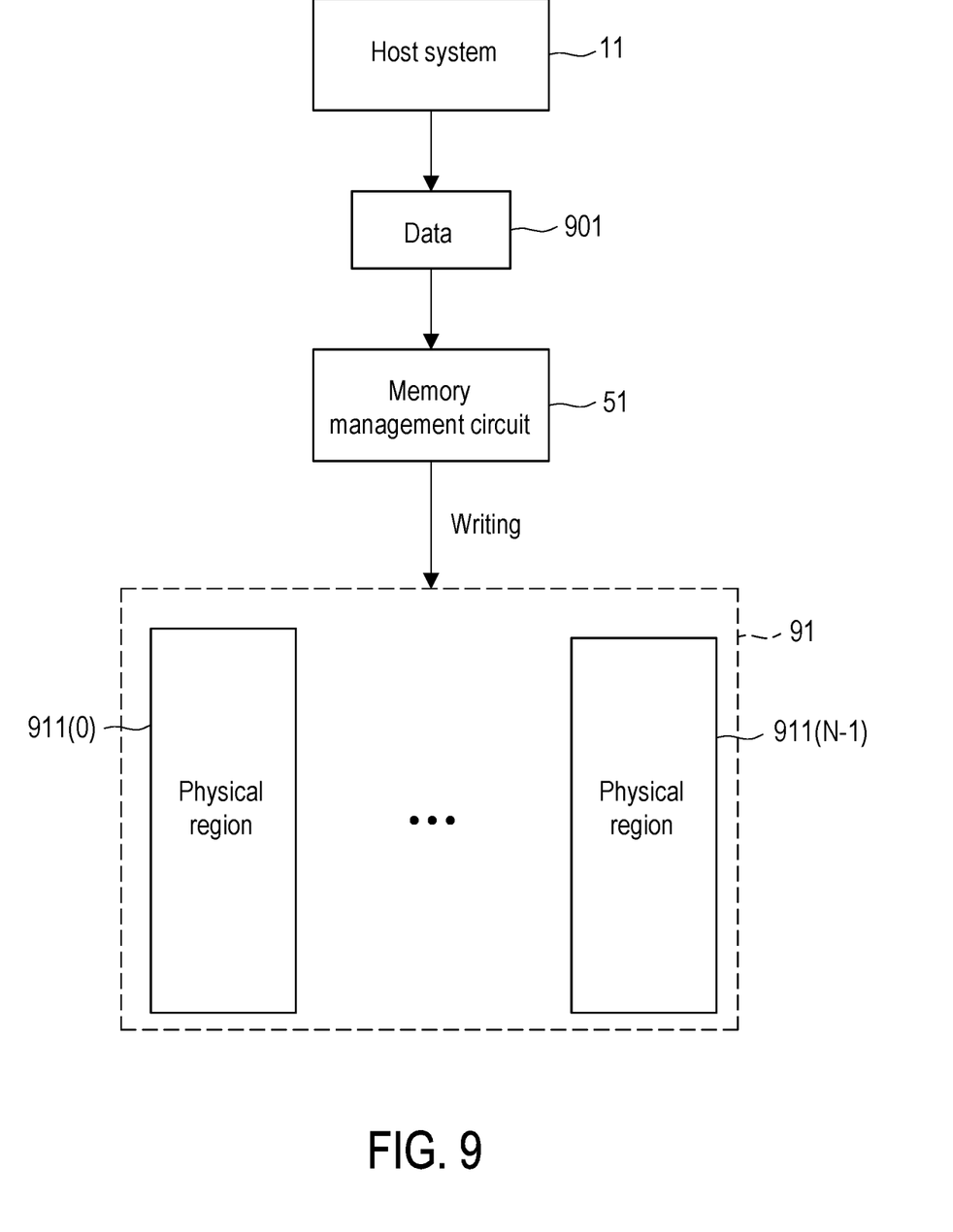
FIG. 9 is a schematic diagram of storing data based on a first operation mode according to an exemplary embodiment of the disclosure.

FIG. 9 is a schematic diagram of storing data based on a first operation mode according to an exemplary embodiment of the disclosure.

Please refer to FIG. 9. In general, the memory management circuit 51 may receive data (also referred to as first data) 901 from the host system 11. For example, the data 901 may be carried in one or more write commands. According to the data 901 (or the write command), the memory management circuit 51 may send at least one write command sequence to the rewritable non-volatile memory module 43, so as to instruct the rewritable non-volatile memory module 43 to store the data 901 based on the first operation mode. For example, according to the write command sequence, the rewritable non-volatile memory module 43 may continuously write the data 901 to physical regions 911(0) to 911(N−1) in a physical management unit 91. For example, multiple data segments of the data 901 may be sequentially or parallelly written to multiple physical units in the physical regions 911(0) to 911(N−1).

Figure 10:
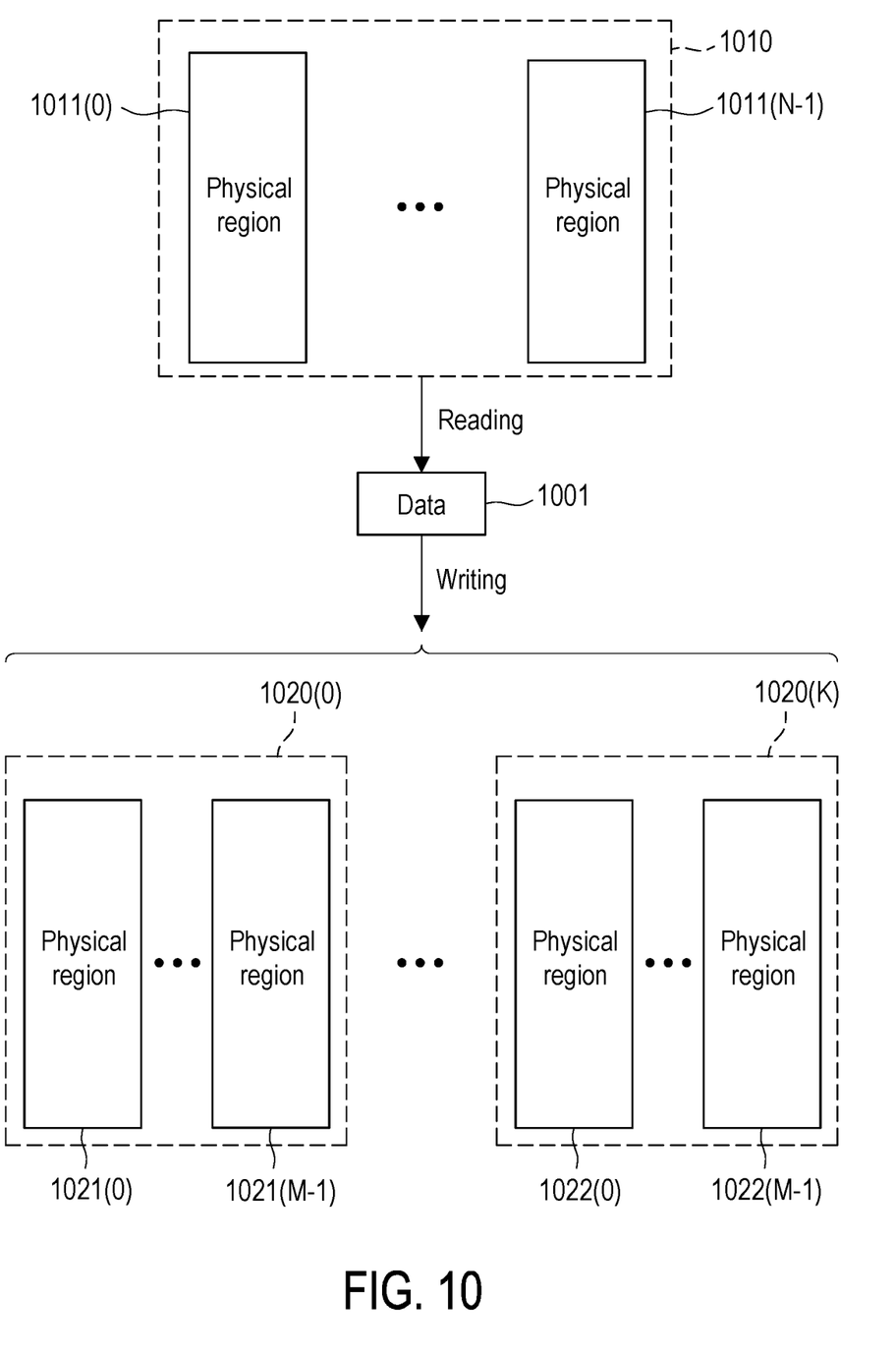
FIG. 10 is a schematic diagram of executing a data consolidation operation based on a second operation mode according to an exemplary embodiment of the disclosure.

FIG. 10 is a schematic diagram of executing a data consolidation operation based on a second operation mode according to an exemplary embodiment of the disclosure.

Please refer to FIG. 10, it is assumed that a physical management unit 1010 serving as a source unit of valid data originally stores data based on the first operation mode. For example, the physical management unit 1010 operating in the first operation mode includes physical regions 1011(0) to 1011(N−1). After activating the data consolidation operation, the memory management circuit 51 may send a read command sequence to the rewritable non-volatile memory module 43 to instruct the rewritable non-volatile memory module 43 to collect data 1001 from the physical regions 1011(0) to 1011(N−1) in the physical management unit 1010. For example, the data 1001 includes the valid data. Then, the memory management circuit 51 may send at least one write command sequence to the rewritable non-volatile memory module 43 to instruct the rewritable non-volatile memory module 43 to store the collected valid data in physical management units 1020(0) to 1020(K) serving as target units based on the second operation mode. For example, the memory management circuit 51 may store the collected data 1001 (that is, the valid data) in physical regions 1021(0) to 1021(M−1) in the physical management unit 1020(0) and physical regions 1022(0) to 1022(M−1) in the physical management unit 1020(K) based on the second operation mode.

It should be noted that the total number (that is, M) of physical regions included in (or crossed by) a single physical management unit 1020(i) serving as the target unit is different from (for example, less than) the total number (that is, N) of physical regions included in (or crossed by) a single physical management unit 1011(j) serving as the source unit. In an exemplary embodiment, through reducing the total number of physical regions included in (or crossed by) a single physical management unit, the execution efficiency of the data consolidation operation can be improved (for example, the storage efficiency of valid data can be improved). In addition, if the data consolidation operation is activated along with the power-off event or the power-on event, the improvement of the execution efficiency of the data consolidation operation will also help to improve system stability.

In an exemplary embodiment, the direction of data reading and writing of FIG. 10 may also be reversed. For example, in an exemplary embodiment, after storing data in some physical regions based on the second operation mode, the memory management circuit 51 may read the data from the physical regions and then store the data in other physical regions based on the first operation mode.

In an exemplary embodiment, the memory management circuit 51 may determine to store data in a specific physical management unit among the physical management units based on the second operation mode according to the type of the data to be stored. In this way, a write amplification factor (WAF) caused to the rewritable non-volatile memory module 43 by executing a small data writing behavior each time may be further reduced.

Figure 11:
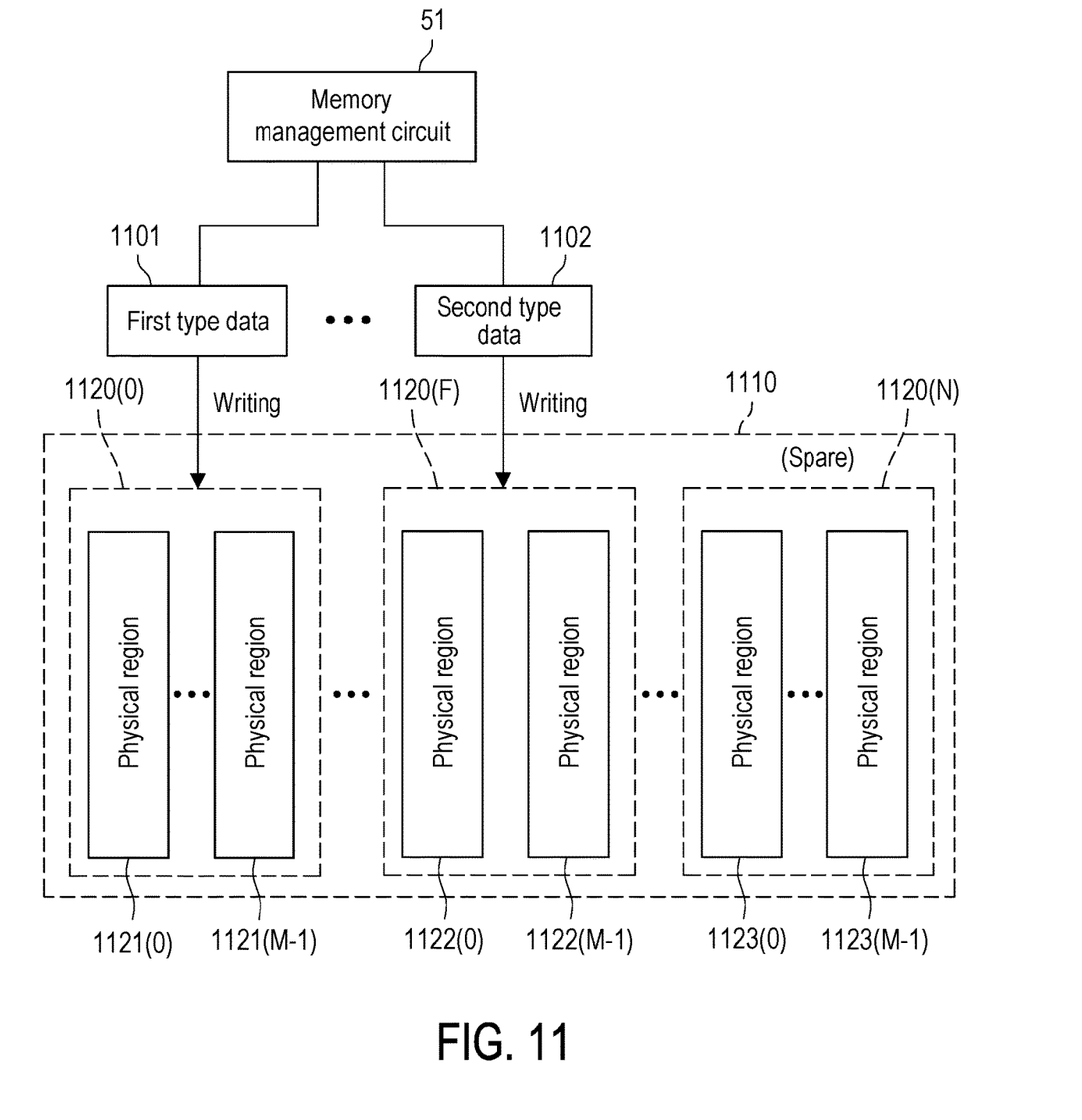
FIG. 11 is a schematic diagram of storing data based on a second operation mode and a data type according to an exemplary embodiment of the disclosure.

FIG. 11 is a schematic diagram of storing data based on a second operation mode and a data type according to an exemplary embodiment of the disclosure.

Please refer to FIG. 11. It is assumed that the data to be stored includes first type data 1101 and second type data 1102. In the second operation mode, the memory management circuit 51 may send a write command sequence to the rewritable non-volatile memory module 43 to instruct to respectively store the first type data 1101 and the second type data 1102 in physical management units 1120(0) and 1120(F). For example, the first type data 1101 may be continuously stored in physical regions 1121(0) to 1121(M−1) in the physical management unit 1120(0) based on the second operation mode, and the second type data 1102 may be continuously stored in physical regions 1122(0) to 1122(M−1) in the physical management unit 1120(F) based on the second operation mode. In an exemplary embodiment, compared to adopting a preset physical management unit, after reducing the total number of physical regions included in (or crossed by) the physical management unit, even if the data content is frequently updated for a specific type of data, the write amplification factor can still be effectively suppressed. In addition, through reducing the total number of physical regions included in (or crossed by) the physical management unit, the data writing efficiency of small data can also be effectively improved.

In an exemplary embodiment, different types of data for data writing based on the second operation mode may include different types of table data. For example, the first type data 1101 in FIG. 11 may include a logical-to-physical mapping table corresponding to a certain logical range, the second type data 1102 may include a logical-to-physical mapping table corresponding to another logical range, etc., and the disclosure does not limit how to classify the data to be stored.

It should be noted that in an exemplary embodiment of FIG. 11, for a physical management unit 1110 that is preset to operate in the first operation mode, after storing the first type data 1101 and the second type data 1102 based on the second operation mode, a physical management unit 1120(N) that is preset to be included in the physical management unit 1110 may still be in a spare state. The physical management unit 1120(N) includes physical regions 1123(0) to 1123(M−1). In particular, the physical management unit 1120(N) being in the spare state refers to that the physical management unit 1120(N) is not written with data in the case where at least the physical management units 1120(0) and 1120(F) are stored with data. Thereafter, other types of data may also be stored in the physical management unit 1120(N) based on the second operation mode.

From another point of view, in an exemplary embodiment of FIG. 11, the single physical management unit 1110 that is preset to operate in the first operation mode may be split into multiple physical management units 1120(0) to 1120(N) operating in the second operation mode, and the total number of the physical management units 1120(0) to 1120(N) may be more or less. For different types of data, in a data writing operation each time, data writing is executed on only a part of the physical management units 1120(0) to 1120(N). Compared with using the complete physical management unit 1110 to execute data writing, using the split physical management units 1120(0) to 1120(N) to respectively execute data writing can improve data writing efficiency and/or effectively suppress the write amplification factor.

Figure 12:
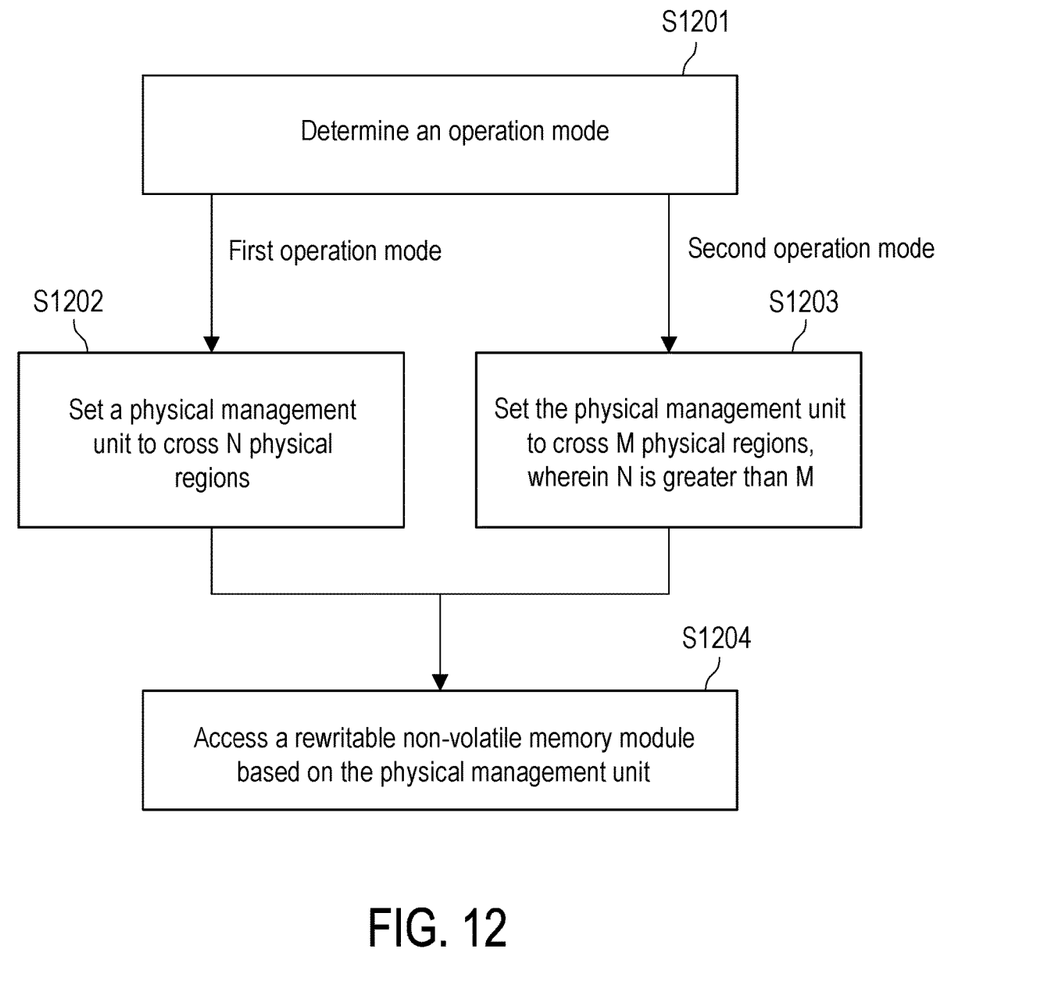
FIG. 12 is a flowchart of a memory management method according to an exemplary embodiment of the disclosure.

FIG. 12 is a flowchart of a memory management method according to an exemplary embodiment of the disclosure.

Please refer to FIG. 12. In Step S1201, an operation mode of a rewritable non-volatile memory module is determined. If (in response to) the determined operation mode is (being) a first operation mode, in Step S1202, a physical management unit is set to cross N physical regions. Alternatively, if (in response to) the determined operation mode is (being) the second operation mode, in Step S1203, the physical management unit is set to cross M physical regions, wherein N is greater than M. In Step S1204, the rewritable non-volatile memory module is accessed based on the set physical management unit.

However, each step in FIG. 12 has been described in detail above and will not be repeated here. It should be noted that each step in FIG. 12 may be implemented as multiple program codes or circuits, which is not limited in the disclosure. In addition, the method of FIG. 12 may be used in conjunction with the above exemplary embodiments or may be used alone, which is not limited in the disclosure.

In summary, the memory management method, the memory storage device, and the memory control circuit unit according to the exemplary embodiments of the disclosure can dynamically determine the size of the physical management unit (that is, the total number of physical regions crossed by the physical management unit) according to different operation situations. The determined physical management unit may be used to access the rewritable non-volatile memory module. The management flexibility and the performance of the rewritable non-volatile memory module can be improved through flexibly configuring the physical management unit to access the rewritable non-volatile memory module.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A memory management method for a rewritable non-volatile memory module, the memory management method comprising:
    in a first operation mode, setting a physical management unit to cross a first number of die, chip enabled region, or plane in the rewritable non-volatile memory module;
    in a second operation mode, setting the physical management unit to cross a second number of said die, said chip enabled region, or said plane in the rewritable non-volatile memory module, wherein the first number is greater than the second number; and
    accessing the rewritable non-volatile memory module based on the physical management unit.

2. The memory management method according to claim 1, further comprising:
    detecting a target event; and
    in response to the target event, switching an operation mode of the rewritable non-volatile memory module from the first operation mode to the second operation mode.

3. The memory management method according to claim 2, further comprising:
    in response to completing the target event, restoring the operation mode from the second operation mode to the first operation mode.

4. The memory management method according to claim 2, wherein the target event comprises one of a power-off event, a power-on event, and a table writing event.

5. The memory management method according to claim 4, wherein the target event further reflects that a total number of spare physical units in the rewritable non-volatile memory module is less than a threshold, and the spare physical units do not store valid data.

6. The memory management method according to claim 1, wherein the step of accessing the rewritable non-volatile memory module based on the physical management unit comprises:
    in the first operation mode, continuously writing first data to N physical regions in the rewritable non-volatile memory module; and
    in the second operation mode, continuously writing second data to M physical regions in the rewritable non-volatile memory module, wherein N is different from M.

7. The memory management method according to claim 1, further comprising:
    activating a data consolidation operation,
    wherein the data consolidation operation comprises:
        collecting valid data from N physical regions operating in the first operation mode in the rewritable non-volatile memory module; and
        storing the valid data in M physical regions based on the second operation mode in the rewritable non-volatile memory module, wherein N is different from M.

8. A memory storage device, comprising:
    a connection interface unit, used to couple to a host system;
    a rewritable non-volatile memory module; and
    a memory control circuit unit, coupled to the connection interface unit and the rewritable non-volatile memory module,
    wherein the memory control circuit unit is used to:
        in a first operation mode, set a physical management unit to cross a first number of die, chip enabled region, or plane in the rewritable non-volatile memory module;
        in a second operation mode, set the physical management unit to cross a second number of said die, said chip enabled region, or said plane in the rewritable non-volatile memory module, wherein the first number is greater than the second number; and
        access the rewritable non-volatile memory module based on the physical management unit.

9. The memory storage device according to claim 8, wherein the memory control circuit unit is further used to:
    detect a target event; and
    in response to the target event, switch an operation mode of the rewritable non-volatile memory module from the first operation mode to the second operation mode.

10. The memory storage device according to claim 9, wherein the memory control circuit unit is further used to:
    in response to completing the target event, restore the operation mode from the second operation mode to the first operation mode.

11. The memory storage device according to claim 9, wherein the target event comprises one of a power-off event, a power-on event, and a table writing event.

12. The memory storage device according to claim 11, wherein the target event further reflects that a total number of spare physical units in the rewritable non-volatile memory module is less than a threshold, and the spare physical units do not store valid data.

13. The memory storage device according to claim 8, wherein the operation of the memory control circuit unit accessing the rewritable non-volatile memory module based on the physical management unit comprises:
    in the first operation mode, instructing to continuously write first data to N physical regions in the rewritable non-volatile memory module; and
    in the second operation mode, instructing to continuously write second data to M physical regions in the rewritable non-volatile memory module, wherein N is different from M.

14. The memory storage device according to claim 8, wherein the memory control circuit unit is further used to: activate a data consolidation operation, wherein the data consolidation operation comprises:
  instructing to collect valid data from N physical regions operating in the first operation mode in the rewritable non-volatile memory module; and
  instructing to store the valid data in M physical regions based on the second operation mode in the rewritable non-volatile memory module, wherein N is different from M.

15. A memory control circuit unit for controlling a rewritable non-volatile memory module, the memory control circuit unit comprising:
  a host interface, used to couple to a host system;
  a memory interface, used to couple to the rewritable non-volatile memory module;
  a memory management circuit, coupled to the host interface and the memory interface,
  wherein the memory management circuit is used to:
    in a first operation mode, set a physical management unit to cross a first number of die, chip enabled region, or plane in the rewritable non-volatile memory module;
    in a second operation mode, set the physical management unit to cross a second number of said die, said chip enabled region, or said plane in the rewritable non-volatile memory module, wherein the first number is greater than the second number; and
    access the rewritable non-volatile memory module based on the physical management unit.

16. The memory control circuit unit according to claim 15, wherein the memory management circuit is further used to:
  detect a target event; and
  in response to the target event, switch an operation mode of the rewritable non-volatile memory module from the first operation mode to the second operation mode.

17. The memory control circuit unit according to claim 16, wherein the memory management circuit is further used to:
  in response to completing the target event, restore the operation mode from the second operation mode to the first operation mode.

18. The memory control circuit unit according to claim 16, wherein the target event comprises one of a power-off event, a power-on event, and a table writing event.

19. The memory control circuit unit according to claim 18, wherein the target event further reflects that a total number of spare physical units in the rewritable non-volatile memory module is less than a threshold, and the spare physical units do not store valid data.

20. The memory control circuit unit according to claim 15, wherein the operation of the memory management circuit accessing the rewritable non-volatile memory module based on the physical management unit comprises:
  in the first operation mode, instructing to continuously write first data to N physical regions in the rewritable non-volatile memory module; and
  in the second operation mode, instructing to continuously write second data to M physical regions in the rewritable non-volatile memory module, wherein N is different from M.

21. The memory control circuit unit according to claim 15, wherein the memory management circuit is further used to:
  activate a data consolidation operation,
  wherein the data consolidation operation comprises:
    instructing to collect valid data from N physical regions operating in the first operation mode in the rewritable non-volatile memory module; and
    instructing to store the valid data in M physical regions based on the second operation mode in the rewritable non-volatile memory module.

* * * * *